United States Patent [19]
Viterbo et al.

[11] 3,907,823

[45] Sept. 23, 1975

[54] DIBENZOCYCLOHEPTAN-DIOXOLAN DERIVATIVES AND THEIR PREPARATION METHOD

[75] Inventors: Rene Viterbo, Paris, France; Giovanni Brancaccio; Giulio Cesare Perri, both of Naples, Italy

[73] Assignee: Richardson-Merrell S.p.A., Naples, Italy

[22] Filed: Apr. 9, 1974

[21] Appl. No.: 459,272

[52] U.S. Cl. ..................... 260/247.7 E; 260/268 PC; 260/293.58; 260/326.5 CA; 424/248; 424/250; 424/267; 424/274
[51] Int. Cl.² ........................................ C07D 295/00

[58] Field of Search ........... 260/247.7 N, 326.5 CA, 260/293.58, 268 PC

[56] References Cited
UNITED STATES PATENTS
3,726,900  4/1973  Fauran et al................. 260/247.7 N

*Primary Examiner*—Robert Gerstl
*Assistant Examiner*—Richard D. Kelly
*Attorney, Agent, or Firm*—George W. Rauchfuss, Jr.; Eugene O. Retter

[57] ABSTRACT

The invention relates to dibenzo-cycloheptan-dioxolan derivatives having antispastic activity and the method of preparing them.

6 Claims, No Drawings

DIBENZOCYCLOHEPTAN-DIOXOLAN DERIVATIVES AND THEIR PREPARATION METHOD

FIELD OF INVENTION

This invention relates to pharmacologically active cis-and/or trans- 3a,12b-dihydro-8H-dibenzo[3,4:6,7]-cyclohepta-[1,2-d]-1,3-dioxolanes and the methods of preparing same. These compounds are represented by the following general formula:

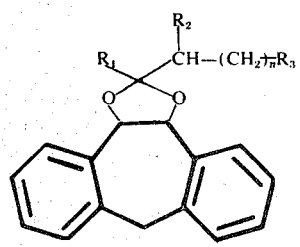

wherein $R_1$ and $R_2$ are each hydrogen and $R_3$ is selected from pyrrolidine, piperidine, morpholine, piperazine and N'-(lower)-alkyl piperazine and n is a whole integer of 0 to 3, preferably 1.

DETAILS OF INVENTION

In the $R_3$ definition (lower) alkyl means a chain of 1 to 6 carbon atoms, that is, alkyl may be methyl, ethyl, propyl, butyl, pentyl, hexyl, in linear or branched chains.

Among the inorganic acids which can be used we mention, for example, hydrochloric acid, hydrobromic acid, hydriodic acid, sulphuric acid, phosphoric acid, and the like. Among the organic acids there may be mentioned, for example, salts of acetic acid, lactic acid, pyruvic acid, malonic acid, succinic acid, fumaric acid, malic acid, tartaric acid, citric acid, ascorbic acid, maleic acid, benzoic acid, phenylacetic acid, 4-aminobenzoic acid, salicylic acid, phosphosalicylic acid, and the like.

These new compounds, upon undergoing pharmacological tests, showed pharmacological activities; particularly antispastic activity. These novel active compounds may be used in therapy alone or together with other active ingredients and may be administered at the suitable doses in coated-tablets, tablets, capsules, suppositories, suspensions and solutions. Dosages can be adjusted to individual requirements. In Table II there are exemplary results of some of the pharmacological tests according to the well known test methods. In our co-pending United States application Ser. No. 221,048, filed on Jan. 26, 1972, cis- and trans- derivatives of 3a,-12b-dihydro-8H-dibenzo-[3,4:6,7]cyclohepta[1,2-d]-1,3-dioxolan-8-one and of 3a,12b-dihydro-8H-dibenzo-[3,4:6,7]cyclohepta[1,2-d]-1,3-dioxolan-8-ol are disclosed, which differ from these because of the missing ketonic and alcoholic function in 8 position of cycloheptane.

The compounds of this invention are prepared starting from 10,11-dibromo-10,11-dihydro-5H-dibenzo[a,d]cycloheptane according to the following reaction scheme:

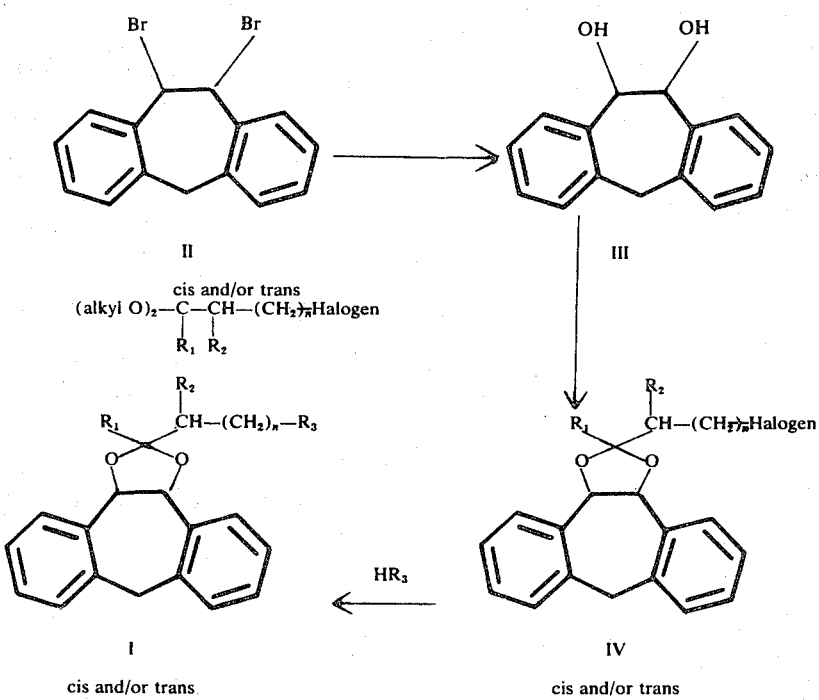

The compounds of this invention form stable addition salts with non-toxic organic or inorganic acids. These pharmaceutically acceptable salts are also included within the scope of the present invention.

By reacting the dibromo compound II (Treibs W. et al.: Ber. 84, 671 (1951)) with silver acetate in the presence of aqueous acetic acid and saponifying the reaction product with methanolic KOH, we obtain cis- 10,11-dihydroxy-10,11-dihydro-5H-dibenzo[a,d]cycloheptane. (III)

By reacting the dibromo compound with silver acetate in the presence of anhydrous acetic acid and saponifying the reaction product with alkaline hydroxide, we obtain the trans isomer of dibenzocycloheptane as described by Rigaudy J. et al. (Bull. Soc. Chim. France 400, 1960). The compounds having formula IV in their cis or trans form are obtained according to the methods described by Buchanan G. L. and Jahvery D. B. (J.O.C. 26, 4295, 1965) and by Rigaudy J. and Nedelec L. (Bull. Soc. Chim. France 400, 1960).

By reacting the diol compound with the proper haloketones or haloaldehydes or with their haloacetals one obtains 2-haloalkyldioxolans having formula IV (cis- and/or trans-). The reaction takes place with or without solvent and in the presence or absence of a suitable acidic catalyst.

According to the invention one can use aprotic solvents stable in reaction conditions, such as, for example, benzene, toluene, xylene, ethyl ether or petroleum ether. The reaction may be conducted at a temperature of between room temperature and the boiling temperature of the solvent when the reaction is performed in the presence of a solvent, otherwise a reaction temperature of between 50° and 180°C. is employed when the reaction is performed in absence of solvent. The reaction time will depend on the temperature and is generally between about 60 minutes and 108 hours. The acid catalyst may be chosen from among Lewis' acids, p-toluensulphonic acid, sulphuric acid, hydrochloric acid or phosphoric acid.

Upon completion the reaction mixture is cooled to room temperature, dried and the residue is purified by crystallization or distillation, or used as such in the further reactions.

By reacting cis- and/or trans- compounds of formula IV with a primary or secondary amine, $HR_3$, according to the $R_3$ definition, one obtains cis- and/or trans- compounds of formula I. The reaction is performed by dissolving the haloderivative of formula III (cis and/or trans) and the corresponding amine in a solvent stable in reaction conditions. Generally in the invention toluene is preferred, but also benzene, xylene, ethyl ether, tetrahydrofuran, ethyl alcohol, methyl alcohol, petroleum ether and the like may be used.

To remove the hydrochloric acid split off during the reaction, twice as much amine involved in the reaction is used or a tertiary amine such as trimethylamine, triethylamine or dimethylaniline, or sodium or potassium carbonate or bicarbonate may also be employed.

This reaction is performed at a temperature varying from the room temperature to the boiling temperature of the solvent used, and the reaction time will depend on the temperature. By cooling the reaction mixture to room temperature one obtains a solid precipitate which is a hydrochloride of the base used to remove the hydrochloric acid. The precipitate is then filtered off and the filtered solution dried. The residue is purified by distillation, crystallization or chromatography. According to another method contemplated by the invention, the reaction mixture may be diluted with a water non-miscible solvent such as benzene, toluene or ethyl ether; washed with water, dried over $Na_2SO_4$ and concentrated. The residue is purified by distillation, crystallization, or chromatography, or transformed into a non-toxic organic, or inorganic, acid salt.

To obtain these salts the base compound is dissolved in ethyl ether, acetone, benzene, toluene, methyl alcohol, or ethyl alcohol and the like and added to the acid as such or dissolved in a solvent chosen among the aforesaid ones.

The compound structure is confirmed besides by the preparation method, also by U.V. and I.R. spectra and by correspondence between calculated values for the elements and values found by chemical analysis.

The following examples are illustrative of the invention.

PREPARATION A

A suspension of 130 g of 10,11-dibromo-10,11-dihydro-5H-dibenzo[a,d]cycloheptene and 195 g of silver acetate in 3000 ml of acetic acid and 190 ml of water is heated at 80°C. for 4 hours with stirring. The reaction mixture is cooled then filtered to remove the formed silver salt. The filtered solution is concentrated to dryness at a lowered pressure. The residue is added to 1,000 ml of an ethanolic solution of KOH at 10 percent. The resulting solution is heated at about 100°C. for 10 minutes. The mixture is cooled to room temperature, diluted with an equal volume of water, acidified with 4N HCl and then extracted several times with ethyl ether. The collected ethereal extracts are dehydrated and concentrated at a lowered pressure. The solid residue is washed with benzene and then with petroleum ether. 44 g (53%) of the chromatographically pure cis-10,11-dihydroxy-10,11-dihydro-5H-dibenzo[a,d]cycloheptene are obtained. M.P. 163°-165°C. It is crystallized from EtOH. M.P. 173°-175°C.

Calculated for $C_{15}H_{14}O_2$: 79.62%C; 6.24%H. Found: 79.74%C; 6.52%H.

U.V. spectra in ethanol 95°: λ max; 261 mµ; ε = 490.

PREPARATION B

A mixture of 44 g of cis-10,11-dihydroxy-10,11-dihydro-5H-dibenzo[a,d]cycloheptene and 40 ml of diethylacetal of alpha-bromoaldehyde is heated at 165°-170°C. for 70-80 minutes. The excedent acetal is removed at lowered pressure and the reaction mixture is treated with 20 ml of ethyl ether, left to settle at 0°C. for several hours and the formed solid is then collected by filtration. It is washed with 20 ml of cold ethanol and then with petroleum ether. 22 g of cis-3a,12b-dihydro-2-(bromomethyl)-8H-dibenzo[3,4:6,7]cyclohepta[1,2-d]-1,3-dioxolan are obtained. M.P. 170°-172°C.

Calculated for $C_{17}H_{15}BrO_2$: 61.65%C; 4.57%H. Found: 61.74%C; 4.65%H.

EXAMPLE 1

A mixture of 18 g (0.0543 mole) of cis-3a,12b-dihydro-2-(bromomethyl)-8H-dibenzo[3,4:6,7]cyclohepta[1,2-d]-1,3-dioxolan and 10 ml (0.113 mole) of morpholine in 150 ml of toluene is heated to boiling for 70 hours. The reaction mixture is cooled then stirred with water to neutral pH. The organic phase is dehydrated over $Na_2SO_4$ and concentrated at a lowered pressure to dryness. The residue is added to acetone and then filtered. 11.6 g of cis- 3a,12b-dihydro-2-(morpholinomethyl)-8H-dibenzo-[3,4:6,7]cyclohepta[1,2-d]-1,3-dioxolan are obtained. M.P. 176°–178°C.

Calculated for $C_{21}H_{23}NO_3$: 74.75%C; 6.87%H; 4.15%N. Found: 74.53%C; 7.01%H; 4.40%N.

EXAMPLE 2

A mixture of 14 g (0.042 mole) of cis-3a,12b-dihydro-2-(bromomethyl)-8H-dibenzo[3,4:6,7]cyclohepta[1,2-d]-1,3-dioxolan and 11 ml (0.11 mole) of piperidine in 150 ml of toluene is heated to boiling for 60 hours. The cooled reaction mixture is filtered to remove the formed solid compound. The filtered solution is stirred water to neutral pH, dehydrated over $Na_2SO_4$ and then concentrated at a lowered pressure. The residue is treated with 1N HCl and the solid formed is collected by filtration. It is washed with water, EtOH and $Et_2O$. 5.6 g of cis-3a,12b-dihydro-2-(piperidinomethyl)-8H-dibenzo-[3,4:6,7]cyclohepta[1,2-d]-1,3-dioxolan are obtained. M.P. 240°–242°C. It is crystallized from EtOH. M.P. 241°–242°C.

Calculated for $C_{22}H_{26}ClNO_2$: 71.05%C; 7.05%H; 3.77%N; 9.54%Cl. Found: 71.13%C; 7.13%H; 3.73%N; 9.70%Cl.

EXAMPLE 3

A mixture of 9.5 g (0.028 mole) of cis-3a,12b-dihydro-2-(bromomethyl)-8H-dibenzo[3,4:6,7]cyclohepta[1,2-d]-1,3-dioxolan and 10 ml (0.119 mole) of pyrrolidine in 100 ml of toluene is heated to boiling for 60 hours. The reaction mixture is cooled and filtered to remove the solid compound. The filtered solution is stirred with water to neutral pH, dehydrated over $Na_2SO_4$ and concentrated at a lowered pressure. The residue is treated with 60 ml of 2N HCl. The solid compound formed is filtered and crystallized from EtOH. 4.95 g of cis-3a,12b-dihydro-2-(pyrrolidinomethyl)-8H-dibenzo[3,4:6,7]cyclohepta-[1,2-d]-1,3-dioxolan hydrochloride are obtained. M.P. 212°–214°C.

Calculated for $C_{21}H_{23}NO_4$ . HCl: 70.48%C; 6.76%H; 3.91%N; 9.90%Cl. Found: 70.34%C; 6.89%H; 3.78%N; 9.88%Cl.

EXAMPLE 4

A mixture of 7.94 g (0.024 mole) of cis-3a,12B-dihydro-2-(bromomethyl)-8H-dibenzo[3,4:6,7]cyclohepta[1,2-d]-1,3-dioxolan and 4.8 g (0.048 mole) of N-methylpiperazine in 80 ml of toluene is heated to boiling for 60 hours. The reaction mixture is cooled, stirred with water, then dehydrated over $Na_2SO_4$ and finally concentrated at a lowered pressure to complete removal of the solvent. The oily residue is dissolved in ethyl ether. The ethereal solution is mixed with 25 ml of a solution of HCl in ethanol (1.8N). The precipitate formed is filtered and washed with ethanol, acetone and ethyl ether. 6.4 g of cis-3a,12b-dihydro-2-[(4-methyl-1-piperazinyl)methyl]-8H-dibenzo[3,4:6,7]cyclohepta[1,2-d]-1,3-dioxolan hydrochloride are obtained. M.P. 254°–257°C. It is recrystallized. M.P. 266°–268°C. with decomposition.

Calculated for $C_{22}H_{26}N_2O_2$ . 2HCl: 62.41%C; 6.67%H; 6.62%N; 16.75%Cl. Found: 62.24%C; 6.72%H; 6.47%N.

TABLE I

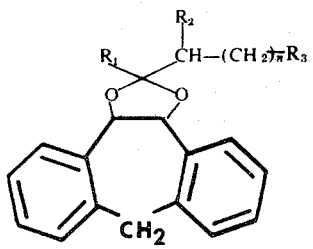

$R_1 = R_2 = H$

| Compound | n | $R_3$ | isomer |
|---|---|---|---|
| Preparation B | 1 | Br | cis |
| Example 1 | 1 | morpholino | cis |
| Example 2 | 1 | piperidino | cis |
| Example 3 | 1 | pyrrolidino | cis |
| Example 4 | 1 | 4-methylpiperazinyl | cis |

Table II

Pharmacological activities
(a) acute toxicity
   $LD_{50}$ with fiducial limits (F1.) (P=0.05)-in the mouse per OS

| Example | $LD_{50}$ mg/Kg/os (F1.) |
|---|---|
| 1 | > 2000 |
| 2 | > 2000 |
| 3 | 1230 (938 – 1612) |
| 4 | > 2000 |

Spearman-Karber (Finney, D.J.-Statistical method in biological assay-2nd edition - page 524 -Griffin and Company 1964)
(b) antispastic activity
   Organ isolated "in vitro": guinea-pig ileum
   Stimulation by $BaCl_2$ (5.10$^{-5}$)

| Example | $ED_{50}$ (γ/ml) |
|---|---|
| 2 | $2.5 \times 10^{-6}$ |
| 3 | $1.5 \times 10^{-6}$ |

We claim:
1. A compound selected from a 3a,12b-dihydro-8H-dibenzo-[3,4:6,7]cyclohepta]1,2-d]-1,3-dioxolan compound having the formula

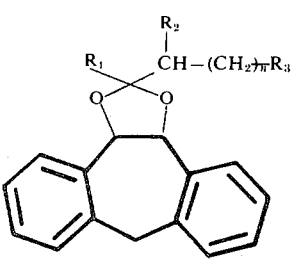

and a pharmaceutically acceptable acid addition salt thereof, wherein $R_1$ and $R_2$ are each hydrogen; $R_3$ is selected from pyrrolidine, piperidine, morpholine, piperazine, and N'-(lower)-alkyl piperazine; n is selected from 0, 1, 2, 3.

2. A compound according to claim 1 in which n is 1.

3. A compound of claim 1 which is cis-3a,12b-dihydro-2-(pyrrolidinomethyl)-8H-dibenzo[3,4:6,7]cyclohepta[1,2-d]-1,3-dioxolane or a pharmaceutically acceptable acid addition salt thereof.

4. A compound of claim 1 which is cis-3a,12b-dihydro-2-(piperidinomethyl)-8H-dibenzo[3,4:6,7]cyclohepta[1,2-d]-1,3-dioxolane or a pharmaceutically acceptable acid addition salt thereof.

5. A compound of claim 1 which is cis-3a,12b-dihydro-2-(morpholinomethyl)-8H-dibenzo[3,4:6,7]cyclohepta[1,2-d]-1,3-dioxolan or a pharmaceutically acceptable acid addition salt thereof.

6. A compound of claim 1 which is cis-3a,12b-dihydro-2-[(4-methyl-1-piperazinyl)methyl]-8H-dibenzo[3,4:6,7]cyclohepta[1,2-d]-1,3-dioxolane or a pharmaceutically acceptable acid addition salt thereof.

* * * * *